United States Patent
Tu et al.

(10) Patent No.: US 10,422,079 B2
(45) Date of Patent: Sep. 24, 2019

(54) METHOD FOR PRESERVING RECYCLED FIBER BY USING BIOCIDES IN PAPER MANUFACTURING AND METHOD FOR MANUFACTURING PAPER USING RECYCLED FIBERS

(71) Applicant: ECOLAB USA INC., St. Paul, MN (US)

(72) Inventors: Wenli Tu, Shanghai (CN); Yumei Lu, Taipei (TW); Zhi Chen, Shanghai (CN); Yulin Zhao, Shanghai (CN)

(73) Assignee: ECOLAB USA INC., St. Paul, MN (US)

( * ) Notice: Subject to any disclaimer, the term of this patent is extended or adjusted under 35 U.S.C. 154(b) by 323 days.

(21) Appl. No.: 15/119,517

(22) PCT Filed: Feb. 5, 2015

(86) PCT No.: PCT/US2015/014600
§ 371 (c)(1),
(2) Date: Aug. 17, 2016

(87) PCT Pub. No.: WO2015/130442
PCT Pub. Date: Sep. 3, 2015

(65) Prior Publication Data
US 2017/0175333 A1 Jun. 22, 2017

(30) Foreign Application Priority Data
Feb. 27, 2014 (CN) .......................... 2014 1 0068306

(51) Int. Cl.
*D21H 17/28* (2006.01)
*D21B 1/32* (2006.01)
(Continued)

(52) U.S. Cl.
CPC ............... *D21H 17/28* (2013.01); *D21B 1/32* (2013.01); *D21C 5/02* (2013.01); *D21H 11/14* (2013.01); *D21H 21/36* (2013.01); *Y02W 30/648* (2015.05)

(58) Field of Classification Search
CPC ........ D21H 21/26; D21H 21/36; D21H 17/28; D21H 11/14; D21B 1/345; D21B 1/32; D21C 5/02; D21C 5/022
See application file for complete search history.

(56) References Cited

U.S. PATENT DOCUMENTS

| 4,562,969 A | 1/1986 | Lindahl |
| 4,983,258 A | 1/1991 | Maxham |

(Continued)

FOREIGN PATENT DOCUMENTS

| CN | 101160431 A | 4/2008 |
| CN | 103180510 A | 6/2013 |

(Continued)

OTHER PUBLICATIONS

Smook, Handbook for Pulp and Paper Technologists, 1992, Angus Wilde Publications, 2nd edition, chapter 14.*

(Continued)

*Primary Examiner* — Anthony Calandra
(74) *Attorney, Agent, or Firm* — Eric D. Babych; Brinks Gilson & Lione

(57) ABSTRACT

The present invention provides a method for preserving recycled fiber by using biocides and a method for manufacturing paper using recycled fiber. The method for manufacturing paper, using recycled fiber as a raw material, comprises pulping procedure: pulping the raw material containing recycled fiber, and papermaking procedure: producing the paper with the pulp slurry obtained in the pulping procedure; wherein the total starch content of recycled fiber (Continued)

is measured before recycled fiber is pulped, and when the total starch content of recycled fiber is higher than a predetermined value, one or more biocides are added during the pulping procedure.

14 Claims, 8 Drawing Sheets

(51) Int. Cl.
*D21H 11/14* (2006.01)
*D21H 21/36* (2006.01)
*D21C 5/02* (2006.01)

(56) References Cited

U.S. PATENT DOCUMENTS

| | | | |
|---|---|---|---|
| 5,211,809 | A | 5/1993 | Naddeo et al. |
| 8,764,942 | B2 † | 7/2014 | Van Haute |
| 2009/0062523 | A1 | 3/2009 | Malkki |
| 2013/0186584 | A1 | 7/2013 | Krapsch et al. |
| 2013/0319627 | A1 | 12/2013 | Van Haute |
| 2014/0020856 | A1* | 1/2014 | Goto ................ D21D 5/02 162/4 |

FOREIGN PATENT DOCUMENTS

| | | |
|---|---|---|
| CN | 102561091 B | 6/2014 |
| JP | 2010-100945 A | 5/2010 |
| JP | 2013-538299 A | 10/2013 |
| TW | 244965 B | 4/1995 |
| WO | WO 2012/025228 A1 | 8/2011 |
| WO | WO 2012/070644 | 5/2012 |
| WO | WO 2013/026578 A1 | 2/2013 |
| WO | WO 2013/045638 A1 | 4/2013 |
| WO | WO 2013/124542 A1 | 8/2013 |

OTHER PUBLICATIONS

Paper, Board and process waters: Starch Content, 2008, SCAN.*
International Search Report and Written Opinion for related International Application No. PCT/US2015/014600, dated May 18, 2015 (12 pages).
*Waste Paper Pulp, Japan, Pulp and Paper Technology*, pp. 113-116 (Aug. 25, 2005).

\* cited by examiner
† cited by third party

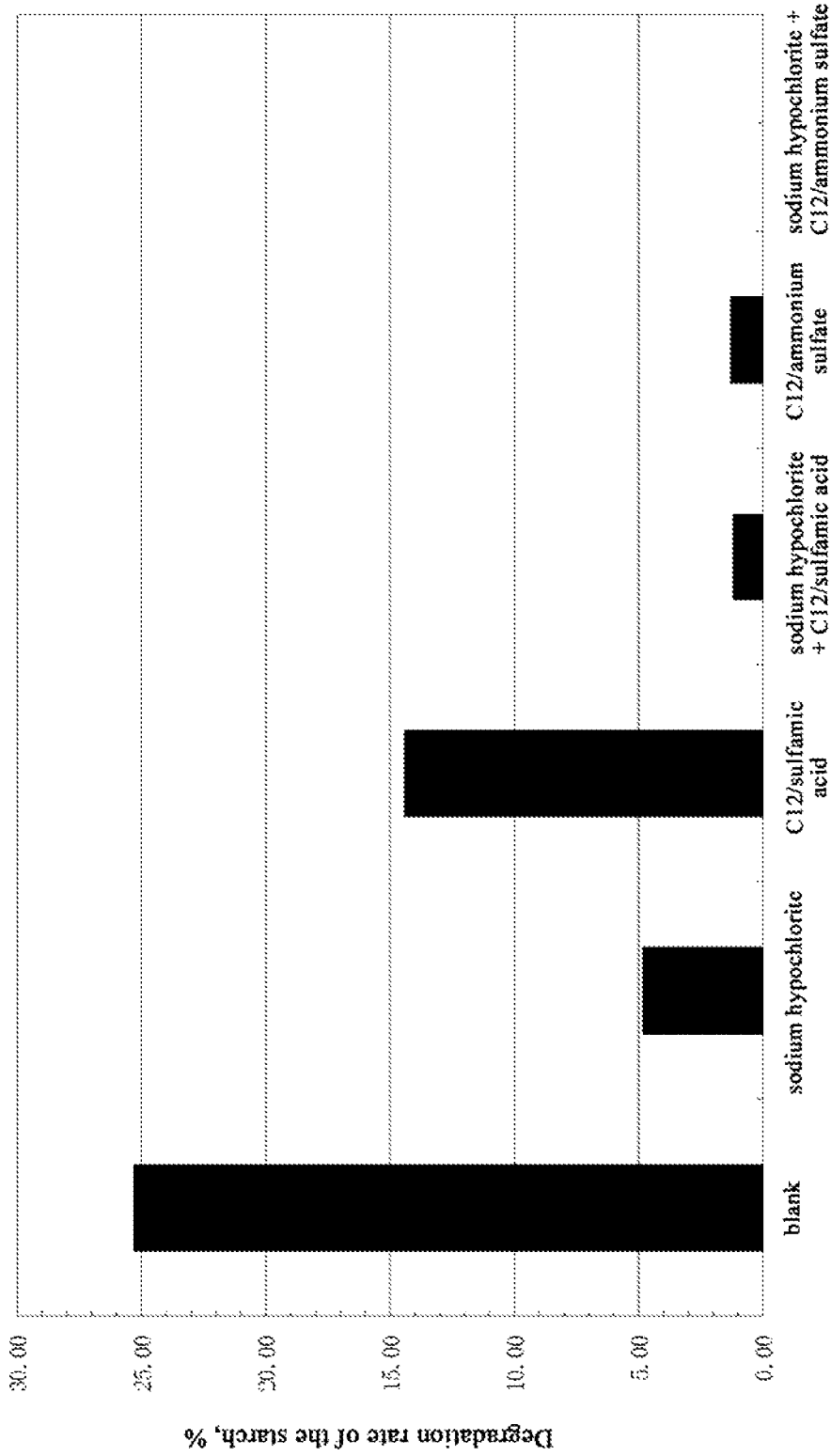

METHOD FOR PRESERVING RECYCLED FIBER BY USING BIOCIDES IN PAPER MANUFACTURING AND METHOD FOR MANUFACTURING PAPER USING RECYCLED FIBERS

TECHNICAL FIELD

The present invention relates to a method for preserving starch in recycled fiber by using biocides in paper manufacturing and a method for manufacturing paper using recycled fiber.

BACKGROUND OF THE INVENTION

Recently, more and more fiber are recycled and reused in paper making processes. In addition, more attention is being paid to the sustainable development of natural environment, forest resources protection and energy resources conservation. Recycled fiber is also called secondary fiber, which is respective to the primary fiber or raw fiber that originates directly from wood resources. Recycled fiber originates from used waste paper, for example, old newspaper, magazine, corrugated paper, paperboard, and the like. After thorough processing steps such as pulping, screening, purifying, stripping, washing, concentrating (or thickening), heat dispensing, rubbing, floating, refining and bleaching, etc., the recycled fiber and lignin therein are reused in papermaking processes.

Using recycled fiber to produce paper or paperboard, etc., in the papermaking industry, can significantly reduce wood cutting and energy consumption, save water resources, and the utilization efficiency of fiber may become more effective (see Reference 1: Environmental Paper Network. Green Press Initiative. 2007. Retrieved 23 Oct. 2011). In Europe, waste paper occupies more than 60% of the whole papermaking fiber raw materials (see Reference 2: European declaration on paper recycling 2006-2010. Monitoring Report 2007. European recovered paper council. Retrieved 17 Jan. 2009). In several papermaking plants in China, such proportion is more than 70%. Since there are also a number additives, such as dry strength agents, starch, and fillers, in recycled fiber, reusing a large amount of additives adsorbed in recycled fiber along with the reutilization of recycled fiber is desired. Providing for the reuse of additives reduces the amount of the additives added in the later papermaking procedure, improves the efficiency of the utilization of recycled fiber, and achieves economic and sustainable developments.

However, in processes utilizing recycled fiber to produce paper and paperboard, during a pulping procedure the recycled fiber is broken or the lengths of fiber are shortened, and the additives adsorbed in the recycled fiber are destroyed or degraded resulting in fiber quality that does not meet the quality requirements of making some kind of paper. Therefore, the amount of fiber or additives has to be increased so as to fulfill the requirements of the product quality. For example, after recycled waste paper is pulped, a large amount of additives such as dry strength agents or starch has to be added to produce paper with satisfied strength. Thus, preserving the additives adsorbed in recycled fiber from destruction and degradation is an important means for improving the utilization efficiency of recycled fiber. It can reduce costs and increase the quality of paper products.

At present, reutilization of the additives in recycled fiber has not been paid high attention, which leads to the decline of reusing efficiency.

SUMMARY OF THE INVENTION

The inventors thoroughly studied the above problems in the papermaking process with use of recycled fiber. Starch is broadly used in a lot of areas of paper sheet and pulp industry. Except pigments, starch is almost the second biggest additive in papermaking industry. As part of the retention aids, starch improves the retention and dehydration efficiency of wet end. Starch is also used as a dry strength additive to enhance the dry strength of paper. Moreover, starch is used as co-binder in coating and emulsifier in sizing to treat the surface of paper sheets so as to improve functional properties of paper sheets. Therefore, the inventors researched the protection and reutilization of starch in recycled fiber as it is a typical additive.

When starch is added into a papermaking machine system, it must be adsorbed effectively by fiber to increase the use efficiency and the retention of starch in the system must be reduced as much as possible, in order to avoid the discharging of starch into waste water which adversely affects the ecosystem. However, because the process in which the cationic starch is adsorbed on the surface of fiber is irreversible, it is difficult to quantitatively measure the total starch content adsorbed in the secondary fiber. In the art, since starch in the recycled fiber is adsorbed by recycled fiber, usually it is impossible to detect them accurately. There is no method that can monitor effectively the change of total starch in recycled fiber, and there is no protection method for the starch in the recycled fiber.

Targeting all starch adsorbed in recycled fiber, the inventors develop a specific method for measuring the total starch content in a recycled fiber sample, a pulping slurry sample and a papermaking sample. Through the study of all the change of the total starch in recycled fiber during the pulping procedure and papermaking procedure, the inventors found that starch in recycled fiber was not well protected during the pulping and papermaking procedures, and that starch was significantly reduced when entered into the wet end for paper production. Since such starch in recycled fiber were not effectively used for making paper, it is necessary to add a lot of starch and dry strength agents to keep the strength of paper sheet.

With respect to the above discovery through research, the present inventors develop a method for manufacturing paper by using recycled fiber as a raw material. By using the present method, the starch in recycled fiber is protected effectively, and thus the amount of starch added into the pulping procedure and papermaking procedure can be significantly reduced.

Specifically, the present disclosure relates to the following methods.

(1). A method for manufacturing paper using recycled fiber as a raw material, comprising the following procedures:

pulping procedure: pulping the raw material containing recycled fiber, and papermaking procedure: producing paper with the pulp slurry obtained in the pulping procedure;

wherein the total starch content in recycled fiber is measured before recycled fiber is pulped, and when the total starch content in recycled fiber is higher than a predetermined value, one or more biocides are added during the pulping procedure.

(2). The method for manufacturing paper of (1), wherein, the predetermined value is 0.1~100 g starch/kg recycled fiber, preferably 1~80 g starch/kg recycled fiber, preferably 1~10 g starch/kg recycled fiber, preferably 5~20 g starch/kg recycled fiber, preferably 5~30 g starch/kg recycled fiber, preferably 1~40 g starch/kg recycled fiber, preferably 1~50 g starch/kg recycled fiber, preferably 1~60 g starch/kg recycled fiber, preferably 1~70 g starch/kg recycled fiber, preferably 10~95 g starch/kg recycled fiber, and preferably 10~30 g starch/kg recycled fiber.

(3). The method for manufacturing paper of (1) or (2), wherein the total starch content of the pulp slurry in the pulping procedure is monitored, and when the total starch content of the pulp slurry in the pulping procedure is lower than the total starch content in recycled fiber before pulping, one or more biocides are added during the pulping procedure; or when the total starch content of the pulp slurry in one of the later steps of the pulping procedure is lower than the total starch content of the pulp slurry in one of the earlier steps of the pulping procedure, one or more biocides are added during the pulping procedure.

(4). The method for manufacturing paper of (3), wherein the pulping procedure comprises the steps of:

crushing the raw material;

screening, thickening and desludging the pulp obtained in the crushing step; and wherein in the pulping procedure, the total starch content of the pulping material in the crushing step is monitored, and when the total starch content of the pulping material in the crushing step is lower than the total starch content of recycled fiber before pulping, one or more biocides are added during the pulping procedure; or the total starch content of the pulping material in the crushing step and the total starch content of the pulp after the screening, thickening and desludging steps are monitored, and when the total starch content of the pulping material after the screening, thickening and desludging steps is lower than the total starch content of the pulping material in the crushing step, one or more biocides are added during the pulping procedure.

(5). The method for manufacturing paper of (4), wherein the pulping procedure further comprises:

separating step: separating fiber in the pulp slurry obtained after the screening, thickening and desludging steps into short fiber and long fiber; and wherein in the pulping procedure, the total starch content of the pulping material in the crushing step and the total starch content in the long fiber and/or the short fiber obtained after the separating step are monitored, and when the total starch content in the long fiber and/or the short fiber is lower than the total starch content of the pulping material in the crushing step, one or more biocides are added during the pulping procedure; or the total starch content of the pulp slurry after the screening, thickening and desludging steps and the total starch content in the long fiber and/or the short fiber obtained after the separating step are monitored, and when the total starch content of the long fiber and/or short fiber is lower than the total starch content of the pulping material after the screening, thickening and desludging steps, one or more biocides are added during the pulping procedure.

(6). The method for manufacturing paper of (5), wherein the pulping procedure further comprises:

grinding the short fiber obtained from the separating step, and heat dispersing and grinding the long fiber, followed by transferring the ground long fiber and short fiber to the papermaking procedure respectively; and wherein in the pulping procedure, the total starch content of the pulping material in the crushing step and the total starch content of the long fiber and/or the short fiber in the grinding step are monitored, and when the total starch content of the long fiber and/or the short fiber in the grinding step is lower than the total starch content of the pulping material in crushing step, one or more biocides are added during the pulping procedure; or the total starch content of the pulping material after the screening, thickening and desludging steps and the total starch content of the long fiber and/or short fiber in the grinding step are monitored, and when the total starch content of the long fiber and/or the short fiber in the grinding step is lower than the total starch content in the pulping material after the screening, thickening and desludging steps, one or more biocides are added during the pulping procedure; or the total starch content of the long fiber and/or the short fiber obtained after the separating step and the total starch content of the long fiber and/or short fiber in the grinding step are monitored, and when the total starch content of the long fiber and/or the short fiber in the grinding step is lower than the total starch content of the long fiber and/or the short fiber obtained after the separating step, one or more biocides are added during the pulping procedure.

(7). The method for manufacturing paper of any one of (1) to (6), wherein the total starch content of the pulp slurry in the papermaking procedure is monitored, and when the total starch content of the pulp slurry in the papermaking procedure is lower than the total starch content in recycled fiber before pulping, one or more biocides are added during the pulping procedure and/or the papermaking procedure; or when the total starch content of the pulp slurry in one of the later steps of papermaking procedure is lower than the total starch content of the pulp slurry in the pulping procedure and/or the total starch content of the pulp slurry in a previous step of papermaking procedure, one or more biocides are added during the pulping procedure and/or the papermaking procedure.

(8). The method for manufacturing paper of any one of (1) to (7), wherein the total starch content of recycled fiber is measured by a method comprising the steps of:

putting a sample of recycled fiber to be measured into water and agitating them to obtain the slurry of the sample to be measured, adding alkali to the obtained slurry and reacting at a heating condition, and measuring the starch content of the slurry after the reaction, wherein the starch content is the total starch content of the sample for measuring.

(9). The method for manufacturing paper of (8), wherein the alkali is selected from the group consisting of sodium hydroxide, potassium hydroxide, calcium hydroxide, barium hydroxide and ammonium hydroxide.

(10). The method for manufacturing paper of (8) or (9), wherein the alkali is added to the slurry in a final concentration of 0.05 mol/L~10 mol/L, preferably 0.1 mol/L~5 mol/L, preferably 0.1 mol/L~1 mol/L, and preferably 0.2 mol/L~0.5 mol/L.

(11). The method for manufacturing paper of any one of (1) to (7), wherein the biocides are added in one or more of the following steps of the pulping procedure:

adding the biocides when the crushing step begins;
adding the biocides during the crushing step;
adding the biocides during the screening, thickening and desludging steps;
adding the biocides during the separation step;
adding the biocides during the grinding step; and
adding the biocides to the mixing chest.

(12). The method for manufacturing paper of any one of (1) to (7), wherein the locations where the biocides are added in the pulping procedure comprise one or more of the followings:

hydrapulping devices, trash-cleaning devices, coarse screening and fine screening devices, pulp storing devices, fiber separation devices, fiber storing devices, thicken devices, grinding devices and/or inlet for the diluting water or white water.

(13). The method for manufacturing paper of (7), wherein the locations where the biocides are added in the papermaking procedure comprise one or more of the followings:

pulp storing devices, broken pools, recycled pulp towers, long fiber or short fiber stock towers, starch stock towers, mixing chests, machine chests, headboxes, high level boxes, wire pits, white water towers, white water pools, cloudy white water pools, filtrate white water pools, clarified water ponds, outlet of fan pumps and/or poly disc filter, warm water chests, clarified water chests and spray ponds.

(14). The method for manufacturing paper of any one of (1) to (13), wherein recycled fiber further comprises the broken paper from the broken paper device of a papermaking process.

(15). The method for manufacturing paper of any one of (1) to (14), wherein the biocides are added in a continuous or batch mode.

(16). The method for manufacturing paper of any one of (1) to (15), wherein the biocides are oxidizing biocides or stabilized oxidizing biocides.

(17). The method for manufacturing paper of (16), wherein the oxidizing biocides comprising oxidizing halogen-type substances, peracetic acid and hydrogen peroxide.

(18). The method for manufacturing paper of (16), wherein the stabilized oxidizing biocides are sulfamic acid and/or ammonium sulfate stabilized oxidizing halogen-type substances.

(19). The method for manufacturing paper of (17) or (18), wherein the oxidizing halogen-type substances are oxidizing chlorine-type substances or oxidizing bromine-type substances.

(20). The method for manufacturing paper of any one of (17) to (19), wherein the oxidizing chlorine-type substances are chlorine, sodium hypochlorite, calcium hypochlorite, trichloroisocyanuric acid (TCCA), dichloroisocyanuric acid (DCCA), 1-bromo-3-chloro-5,5-dimethyl hydantoin (BCDMH) or 1,3-dichloro-5,5-dimethylhydantoin (DCDMH).

(21). The method for manufacturing paper of any one of (1) to (20), wherein the amount of the biocides in the pulping procedure and/or the papermaking procedure represented by the total halogen concentration after adding the biocides is 0.01 ppm to 10 ppm, preferably is 0.01~2.0 ppm, preferably is 0.1~2.0 ppm, preferably is 0.5~2.0 ppm, preferably is 0.5~5.0 ppm, or preferably is 0.1~5.0 ppm.

(22). The method for manufacturing paper of any one of (16) to (21), wherein the oxidizing biocides are added, followed by the addition of the stabilized oxidizing biocides; or the stabilized oxidizing biocides are added, followed by the addition of the oxidizing biocides.

Through utilization of the present methods, that is, the addition of biocides properly in papermaking processes where recycled fiber is used, the starch in recycled fiber is effectively preserved. The starches are prevented from degrading in the pulping and papermaking procedures.

The starch in recycled fiber helps to enhance the strength of the manufactured paper sheets and paper boards, and the amount of starch used in papermaking processes is reduced significantly. It maximizes the recycling and reutilizing of the starch content in recycled fiber, and reduces the amount of the papermaking additives and saves the costs.

The other objects of the present invention will be apparent from the description of the present invention in the present specification. Furthermore, the other features and advantages of the present invention will be described in details in the following description.

BRIEF DESCRIPTION OF THE DRAWINGS

FIG. 7 is a graph that illustrates the degradation rates of the starch in several oxidizing biocide embodiments.

DETAILED DESCRIPTION OF THE INVENTION

Figure 1:
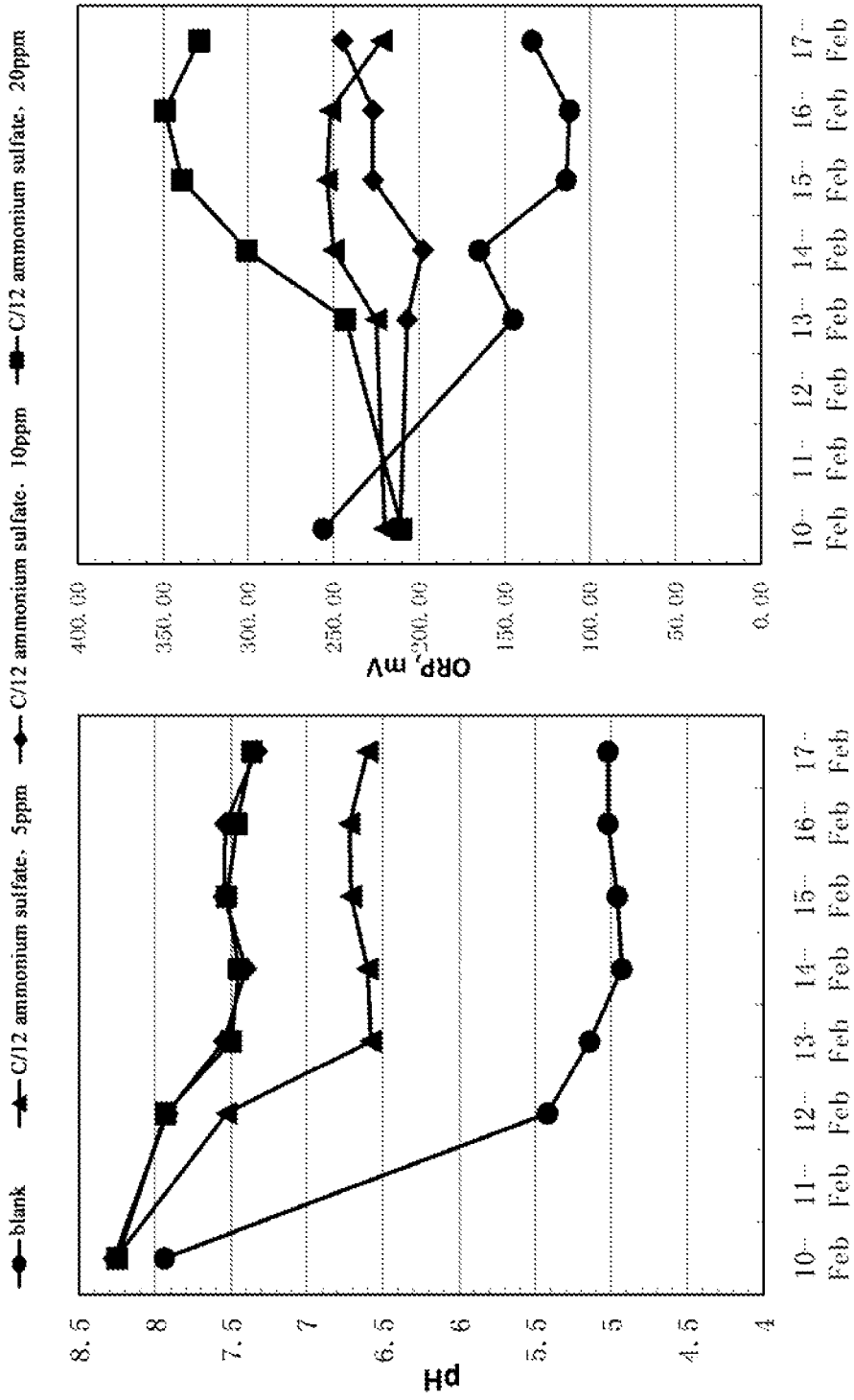
FIG. 1 is a graph that illustrates the changes in ORP and pH of the pulp slurry of Example 2 with the stabilized oxidizing biocides added and the pulp slurry of blank sample with respect to the time.

The detailed description and the embodiments of the invention are described as follows.

It should be understood that the meanings of the terms used in the present application is the same as the common meanings for those skilled in the art unless it is specifically described in the specification. If there is a conflict, the meanings should be understood according to the definition in the present specification. The amounts in the present disclosure are meant to be parts by weight or percent by weight unless they are specifically defined.

Papermaking Processes

A papermaking process is a process which produces pulp and uses the pulp to manufacture paper product. According to different kinds of raw materials, different papermaking processes and devices utilized, a papermaking process includes mainly two procedures, i.e., a pulping procedure and a papermaking procedure.

A pulping procedure usually utilizes chemical methods or mechanical methods or the combination of the methods thereof to dissociate fiber raw materials from plants, and then form the pulp with original color (unbleached pulp) or form the bleached pulp. The products produced by the pulping procedure are called pulp (or paper pulp). Pulp includes but is not limited to mechanical pulp, chemical pulp, chem-mechanical pulp, recycled waste pulp, and the like.

Raw materials for pulping according to the present invention include recycled fiber. Those skilled in the art can choose the ratios between recycled fiber and plant fiber according to the requirements of the paper sheets to be produced.

Since the present invention is directed to use recycled fiber to produce pulp, the pulping procedure in the present invention includes: crushing recycled fiber by a hydrapulper combination system; screening (for example, coarse screening and fine screening), thickening and desludging the pulp slurry from the crushing step by a screening, thickening and cleaning (desludging) system; separating the fiber in the pulp obtained after the screening, thickening and desludging into short fiber and long fiber by a fiber separation system; grinding the short fiber through a burring mill followed by transferring the short fiber to the papermaking procedure and grinding the long fiber through a burring mill after it passes a heat dispersion system followed by transferring the long fiber to the papermaking procedure.

The hydrapulper combination system can include a pulp chain conveyor, a hydrapulper, a waste-guiding well, a hydra-cleaning machine, a cylinder screen, a wire stranding machine, a heavy trash eliminator and so on to crush waste paper raw materials. The screen system is to remove more impurities before decomposed, and a pressure screen, a floating trash eliminator, a vibrating screen and so on may be selected to coarse screen and fine screen the impurities. A cleaning system includes a serious of trash eliminating devices (or desludging devices), such as a high density cleaner, a coarse screen, a middle density cleaner and a light weight cleaner. After the impurities are removed, the fiber is purified and washed by this system. The fiber is separated into long fiber and short fiber by the separation screen. However, the impurities can not be removed completely after the waste paper going through the screening, purifying and washing steps, etc., and the adhesive substances such as heat melt adhesives, waxes and pitches have to be removed by a thermal dispensing system, followed by the treatment in a refining system such as a double disc refiner to obtain pure, high bonding fiber. The pulp obtained from the above pulping procedure is stored in the chest to be used in the papermaking procedure.

According to the properties of paper sheets to be produced, the pulp produced from recycled fiber is mixed in the chest with mechanical pulp, chemical pulp and chem-mechanical pulp produced from fiber, followed by the addition of additives, for example, starches, dry strength agents to the chest according to the needs for the papermaking procedure.

Those skilled in the art can choose a proper papermaking procedure according to the pulp. A papermaking procedure, for example, includes the following steps: (1) Retention, i.e., the pulp is transported to the forming section (wire section) through a headbox. The headbox can not only make fiber to disperse evenly, but also help the slurry to wire stably. During the streaming of the pulp, the papermaking additives such as paper dry strength adjuvants, paper wet strength adjuvants are added. (2) Forming, i.e., the paper material transported from the headbox is filtrated by a wire and formed into wet paper web in the forming section, which is also called a wire section. (3) Press dehydration, i.e., the wet paper web from the forming section is mechanical pressed and formed into wet paper sheet. (4) Drying, i.e., the wet paper sheet is dried by a dryer to remove water content and formed into paper sheet in drying section.

Additionally, the paper sheet can be further treated, such as be calendered, rolled, cut, selected or re-rolled and packaged if needed, which makes it into paper product in plate or roll form. Furthermore, in order to improve the quality of paper sheets, surface sizing, coating, soft calendering at site or super calendering out of the machine can be conducted in the drying section.

The above listed pulping procedure and papermaking procedure are just an illustration, which are not intended to limit the scope of the present invention. The point is that raw materials of the pulping procedure according to the present invention include recycled fiber. The method for manufacturing paper according to the present invention at least comprises a pulping procedure which pulps a raw material containing recycled fiber, and a papermaking procedure which produces paper with the pulp obtained in the pulping procedure.

In one embodiment of the present invention, the devices in the pulping procedure of the method for manufacturing paper according to the present invention include, but are not limited to, hydrapulping devices, cleaning devices (trash-cleaning devices), screening devices, pulp storing devices, fiber separations device, fiber storing devices, concentration devices (thickeners) and refining devices (grinding devices), etc. The devices in the papermaking procedure of the method for manufacturing paper according to the present invention include, but are not limited to, pulp storing devices, broken pools, recycled slurry towers, long fiber or short fiber stock towers, starch stock towers, mixing chests, machine chests, headboxes, high level boxes, wire pits, white water towers, white water pools, cloudy white water pools, filtrate white water pools, clarified water ponds, outlet of fan pumps and/or poly disc filter, warm water chests, clarified water chests and spray ponds, etc.

In one embodiment of the present invention, recycled fiber further comprises fiber of broken paper from broke devices of a papermaking process. The broken paper is the paper derived from the breaking of paper sheet due to the abnormal operation of the paper machine in a continuous papermaking process. It is usually recycled and reused. Since broken paper has the similar composition with the produced paper sheet, i.e., it has a lot of additives such as starch, dry strength agents, it is important to recover such part of broken paper. Not only is the fiber content of broken paper needed to be recycled, but also are the additives such as starch needed to be preserved from degradation during the recycling and reusing processes.

Starch and the Starch in Recycled Fiber of Raw Materials

Starch is an additive with the second biggest volume of use in the papermaking industry except for pigments. As a part of the retention aids, starch improves the retention and dehydration efficiency at wet end. Starch is also used as a dry strength additive to enhance the dry strength. Moreover, starch is used as co-binder in coating and emulsifier in sizing to treat the surface of paper sheets so as to improve functional properties of paper sheets. In common papermaking processes, the amount of starch added is very large, and usually the final starch concentration in paper sheet may be 5 g/kg or more, 10 g/kg or more, 20 g/kg or more, and 50 g/kg or more (the amount of starch per kilogram of paper).

The present invention utilizes recycled fiber (recycled waste paper) as one of the pulping raw materials, since the waste paper contains a lot of starch. And the recycled fiber raw material usually contains a large amount of starch, and such starch is typically adsorbed by recycled waste paper. In the existing papermaking processes utilizing recycled fiber, the large amount of starch adsorbed in recycled fiber is usually ignored. People have not realized that it is needed to preserve starch in recycled fiber, preventing the starch from degrading or decomposing during a pulping procedure and a papermaking procedure. The present inventors focused on starch in recycled fiber and developed methods to preserve starch in recycled fiber raw materials. The methods effectively reduce the additional amount of starch to be added during a papermaking process and enhance the strength of final paper sheets.

In the method for manufacturing paper according to the present invention, when the total starch content of recycled fiber is higher than a predetermined value, the biocides or sterilizing scheme are used, according to the following description, to control the microbes in the pulping, papermaking materials, wherein the total starch content of recycled fiber is measured by the following described method before recycled fiber to be pulped. It will protect the starch of recycled fiber from being consumed by the microbes during the pulping and papermaking procedures, and will reduce significantly the amount of the additives added such as starch, dry strength agents in the whole papermaking process.

The predetermined value in the present invention can be 0.1~100 g starch/kg recycled fiber, can be 1~80 g starch/kg recycled fiber, can be 1~10 g starch/kg recycled fiber, can be 5~20 g starch/kg recycled fiber, can be 5~30 g starch/kg recycled fiber, can be 1~40 g starch/kg recycled fiber, can be 1~50 g starch/kg recycled fiber, can be 1~60 g starch/kg recycled fiber, can be 1~70 g starch/kg recycled fiber, can be 10~95 g starch/kg recycled fiber, or can be 10~30 g starch/kg recycled fiber. The inventors discovered through researching, when the total starch content of the recycled waste paper or paper board is higher than the above predetermined value, it is necessary to protect such starches in the recycled fiber so as to reduce the newly added starch, and finally achieve the enhancement in paper strength when using the recycled paper.

The change of starch content in raw materials during a papermaking process.

In the present invention, except for measuring the total starch content in recycled fiber which is used as raw materials, the change of the starch content during the papermaking process is monitored.

In one embodiment of the present invention, total starch content changes of pulp during the pulping procedure is monitored, when the total starch content of pulp in the pulping procedure is lower than the total starch content of the recycled fiber before pulping, one or more biocides are added to the pulping procedure; or when the total starch content of pulp in a following step of pulping procedure is lower than the total starch content of pulp in a previous step of pulping procedure, one or more following described biocides are added to the pulping procedure. According to the above embodiment, the starch in the recycled fiber raw material is prevented from degrading in the pulping procedure efficiently.

Specifically, for example the pulping procedure comprises the steps of: crushing the raw material; screening, thickening and desludging the pulp obtained in the crushing step. In one specific embodiment, in the pulping procedure, total starch content of the pulping material in the crushing step is monitored, when the total starch content of pulping material in the crushing step is lower than the total starch content of the recycled fibers before pulping, adding one or more biocides to the pulping procedure, for example, adding one or more biocides before the crushing step or during the crushing step; or total starch content of the pulping material in the crushing step is monitored, and total starch content of the pulp after screening, thickening and desludging step is monitored, when the total starch content after screening, thickening and desludging step is lower than the total starch content in the crushing step, adding one or more biocides to the pulping procedure, for example adding one or more biocides to the crushing step and/or screening, thickening and desludging step and/or the pulp storing device after the screening, thickening and desludging step.

Furthermore, the pulping procedure comprises a separating step: separating fiber in the pulp obtained after screening, thickening and desludging step into short fiber and long fiber. In one specific embodiment, total starch content of the pulping material in the crushing step is monitored, and total starch content of the long fiber and/or short fiber obtained after separating step is monitored, when the total starch content of the long fiber and/or short fiber is lower than total starch content in the crushing step, adding one or more biocides to the pulping procedure, for example adding one or more biocides to the crushing step and/or screening, thickening and desludging step and/or the pulp storing device after the screening, thickening and desludging step and/or the pulp storing device for long fiber and/or short fiber; or total starch content of the pulp after screening, thickening and desludging step is monitored, and total starch content of the long fiber and/or short fiber obtained after separating step is monitored, when the total starch content of the long fiber and/or short fiber is lower than the total starch content after screening, thickening and desludging step, adding one or more biocides to the pulping procedure, for example adding one or more biocides to the screening, thickening and desludging step and/or the pulp storing device after the screening, thickening and desludging step and/or the pulp storing device for long fiber and/or short fiber.

Moreover, the pulping procedure further comprises a grinding step: grinding the short fiber obtained from the separating step, and heat dispersing and grinding the long fiber, followed by sending the ground long fiber and short fiber to the papermaking procedure individually. In one specific embodiment, total starch content of the pulping material in the crushing step is monitored, and total starch content of the long fiber and/or short fiber in grinding step is monitored, when the total starch content of the long fiber and/or short fiber in grinding step is lower than the total starch content in crushing step, adding one or more biocides to the pulping procedure, for example adding one or more biocides to the crushing step and/or screening, thickening and desludging step and/or the pulp storing device after the screening, thickening and desludging step and/or the pulp storing device for long fiber and/or short fiber and/or grinding step; or total starch content of the pulping after screening, thickening and desludging step is monitored, and total starch content of the long fiber and/or short fiber in grinding step is monitored, when the total starch content of the long fiber and/or short fiber in grinding step is lower than the total starch content after screening, thickening and desludging step, adding one or more biocides to the pulping procedure, for example adding one or more biocides to the screening, thickening and desludging step and/or the pulp storing device after the screening, thickening and desludging step and/or the pulp storing device for long fiber and/or short fiber and/or grinding step; or total starch content of the long fiber and/or short fiber obtained after separating step is monitored, and total starch content of the long fiber and/or short fiber is monitored in grinding step, when the total starch content of the long fiber and/or short fiber in grinding step is lower than the total starch content of the long fiber and/or short fiber obtained after separating step, adding one or more biocides to the pulping procedure, for example adding one or more biocides to the pulp storing device for long fiber and/or short fiber and/or grinding step.

Through monitoring the changes of the starch content in any steps of pulping procedure, the biocides can be used according to the condition opportunely to kill microbes and bacteria, etc. so as to protect the starch from degrading by such microbes and bacteria. Thus, the following addition amount of the additives such as starch, dry strength agent can be reduced and the strength of the paper sheet produced from such recycled fiber will be enhanced finally.

In one embodiment of the present invention, total starch content during the papermaking procedure is monitored, when the total starch content of pulp in the papermaking procedure is lower than the total starch content of recycled fibers before pulping, one or more following described biocides are added to the pulping procedure and/or papermaking procedure; or when the total starch content of pulp in a following step of papermaking procedure is lower than the total starch content of pulp in pulping procedure and/or the total starch content of pulp in a previous step of papermaking procedure, one or more following described biocides are added to the pulping procedure and/or papermaking procedure. According to the above embodiment, the starch in the recycled fiber which is used as raw material is prevented from degrading in the papermaking procedure efficiently.

Through monitoring the changes of the starch content in any steps of papermaking procedure, the biocides can be used according to the condition opportunely to kill microbes and bacteria, etc. so as to protect the starch from degrading by such microbes and bacteria. Thus, the following addition amount of the additives such as starch, dry strength agent can be reduced and the strength of the paper sheet produced from such recycled fiber will be enhanced finally.

Additionally, it is appreciated that those skilled in the art can understand when the total starch content changes, the biocides can be added at any proper position according to the pulping and papermaking process themselves, without limiting to the above listed positions and process. Moreover, the above steps or devices described in the pulping and papermaking procedures are just examples, and those skilled in the art can understand the pulping and papermaking procedures will change according to the different raw materials or process.

The Measuring Method for Total Starch Content

When researching the starch in the recycled fiber, it is required to detect the total starch content of recycled fiber accurately. The starch measuring methods can be divided to such as enzyme hydrolysis method, acid hydrolysis method in the art. The enzyme hydrolysis method utilizes amylase to hydrolyze starch and the acid hydrolysis method utilizes acid to hydrolyze starch into monosaccharide. Both of these methods detect the reduced sugar and then convert into content of starch. The above detection methods are complicated and the durations of the experiment are relative long. Moreover enzyme will degrade the starch and fiber simultaneously, which may lead to the error in measurement. Acid hydrolysis is not suitable for separating the starch adsorbed by the fiber. Therefore these methods are not suitable for detecting starch adsorbed by the fiber. In order to detect the starch in papermaking, TAPPI (Technical Association of the Pulp and Paper Industry, U.S.A.) conducts the colorimetric determination according to the complex formed from starch and iodine-potassium iodide to measure the unmodified starch added into the surface sizing and pulping processes or the starch modified by traditional oxidation or enzyme conversion. In the method for manufacturing paper in JP 2010-100945A, the content of the starch released from pulping procedure into aqueous solution is measured. The determination method detects the organic acid originated from starch decomposition by HPLC and calculates the starch content accordingly.

Since the adsorption process of cationic starch as papermaking additive to the fiber is an irreversible process, most of the starches in the recycled fiber are in the form of absorption, the content of starches which are released from the recycled fiber into the aqueous solution is limited. Thus, it is impossible to detect all the starch in the recycled fiber by the present existing starch measuring method. Before detecting starch, it is required to take certain pretreatment steps to make the starch desorb from the recycled fiber, and thus measuring the total starch content of the recycled fiber.

The measuring method for total starch content of the recycled fiber comprises the steps of: putting the sample to be detected into water and agitating them to obtain the slurry of the sample to be detected, adding alkali to the obtained slurry and reacting at a heating condition (pretreatment step), which will desorb the starch adsorbed by the recycled fiber, and measuring the starch content of the slurry after reaction, the starch content is the total starch content of the recycled fiber.

The measuring method for total starch content of the pulping material, pulp or raw material in papermaking procedure comprises the steps of: putting the sample to be detected into water and agitating them to obtain the slurry of the sample to be detected, adding alkali to the obtained slurry and reacting at a heating condition (pretreatment step), which will desorb the starch adsorbed by the recycled fiber, and measuring the starch content of the slurry after reaction, the starch content is the total starch content of the pulping material or raw material in papermaking procedure.

In the above method, the adsorbed starch is desorbed by adding a certain amount of alkali. After desorption, the starch content can be measured by the above known method in the art. For example, the present invention conducts the colorimetric determination based on the complex formed from starch and iodine-potassium iodide. The total starch content in the recycled waste paper, paperboard (i.e., the recycled fiber) can be determined accurately by the above measuring method. With regard to the pulping and papermaking raw material in the pulping and papermaking procedures, the total starch content of the pulping and papermaking raw material can by determined accurately by the above measuring method, so as to monitor all the starches accurately to know whether they are consumed, degraded in the pulping or papermaking procedures.

The alkali used in pretreatment can be selected from the group consisting of sodium hydroxide, potassium hydroxide, calcium hydroxide, barium hydroxide and ammonium hydroxide, etc. The alkali is added to the slurry produced from the recycled fiber in a final concentration of 0.05 mol/L~10 mol/L, or 0.1 mol/L~5 mol/L, or 0.1 mol/L~1 mol/L, or 0.2 mol/L~0.5 mol/L to desorb starch in the recycled fiber. The desorption can be conducted under a heating condition and the heating temperature can be 50° C.~100° C., preferably 60~99° C. The time of desorption treatment can be determined properly according to the alkali amount added and the amount of the slurry. For example, the time can be 1 minute to 10 hours, or 10 minutes to 2 hours, or 10 minutes to 1 hour, etc.

By applying the above total starch content measuring method to the method for manufacturing paper according to the present invention, the starch content of the recycled fiber raw material, and the changes in total starch content of the process raw material in the pulping procedure and papermaking procedure are monitored accurately so as to take effective method to protect the starch in the recycled fiber at the proper occasion.

Biocides

Since microbes (bacteria, etc.) grow during the papermaking process, a large number of grown microbes will decompose the raw materials in papermaking process, which produces such as slimes and affects the strength of the final paper product. Thus, usually there is a need to add biocides during the papermaking process to control the growth of the microbes in the pulping and papermaking procedures.

Although it is mentioned that the growing of the microbes are needed to be inhibited in order to prevent their effect on the paper product, a papermaking process which relates to protect and reuse the starch in recycled fiber so as to reduce the addition amount of the additives such as starch has not been previously disclosed.

In the method for manufacturing paper according to the present invention, the recycled fiber is used as a raw material and it is desired to protect the starch containing in the recycled fiber. As mentioned above, in the method for manufacturing paper according to the present invention measures the total starch content of the recycled fiber, when such total starch content is higher than a predetermined value, the method of adding biocides is applied in pulping process to control the number of the microbes during the pulping process so as to protect the starch efficiently.

The biocides used in the present invention can be any biocides known by those skilled in the art. In one embodiment of the present invention, biocides are oxidizing biocides and stabilized oxidizing biocides.

The oxidizing biocides include oxidizing halogen-type substances, peracetic acid and hydrogen peroxide, etc. In at least one embodiment, oxidizing halogen-type substances are oxidizing chlorine-type substances and oxidizing bromine-type substances. The oxidizing chlorine-type substances and oxidizing bromine-type substances are selected from the group consisting of: chlorine, chlorine dioxide, hypochlorous acid and the salts thereof, chlorous acid and the salts thereof, chloric acid and the salts thereof, perchloric acid and the salts thereof, chlorinated isocyanuric acid and the salts thereof, hypobromous acid and the salts thereof, bromous acid and the salts thereof, bromic acid and the salts thereof, perbromic acid and the salts thereof, brominated isocyanuric acid and the salts thereof, and combination thereof. The salts can be alkali metal salts of hypochlorous acid and hypobromous acid such as sodium hypochlorite, sodium hypobromite, potassium hypochlorite and potassium hypobromite; the alkaline earth metal salts of hypochlorous acid and hypobromous acid such as calcium hypochlorite, calcium hypobromite, barium hypochlorite and barium hypobromite; the alkali metal salts of chlorous acid and bromous acid such as sodium chlorite, sodium bromite, potassium chlorite and potassium bromite; the alkaline earth metal salts of chlorous acid and bromous acid such as calcium chlorite, calcium bromite, barium chlorite and barium bromite; other metal salts of chlorous acid and bromous acid such as nickel chlorite; ammonium chlorate and ammonium bromate; the alkali metal salts of chloric acid and bromic acid such as sodium chlorate, sodium bromate, potassium chlorate and potassium bromate; the alkaline earth metal salts of chloric acid and bromic acid such as calcium chlorate, calcium bromate, barium chlorate and barium bromate. One of these oxidizing biocides can be used alone or two or more of these oxidizing biocides can be combined to use. In one embodiment of the present invention, the oxidizing chlorine-type substances are chlorine, sodium hypochlorite, calcium hypochlorite, trichloroisocyanuric acid (TCCA), dichloroisocyanuric acid (DCCA), 1-bromo-3-chloro-5,5-dimethyl hydantoin (BCDMH) or 1,3-dichloro-5,5-dimethylhydantoin (DCDMH).

In one embodiment of the present invention, the stabilized oxidizing biocides are sulfamic acid and/or ammonium sulfate stabilized oxidizing halogen-type substances. The sulfamic acid used in the present invention can be the sulfamic acids represented by the general formula (1) and the salts thereof.

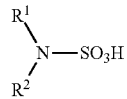

General formula (1)

wherein R1 and R2 each independently represents hydrogen or hydrocarbon groups having 1 to 8 carbon atoms. As specific examples of sulfamic acids represented by the above general formula (1), the sulfamic acid wherein R1 and R2 each independently represents hydrogen, N-methyl sulfamic acid, N,N-dimethyl sulfamic acid and N-phenyl sulfamic acid can be listed. As the salts of sulfamic acid of the present invention, alkali metal salts such as sodium salts and potassium salts; alkaline earth metal salts such as calcium salts, strontium salts and barium salts; other metal salts such as manganese salts, copper salts, zinc salts, ferric salts, cobalt salts and nickel salts; ammonium salts and guanidine salts and so on can be used. Specifically, sodium sulfamate, potassium sulfamate, calcium sulfamate, strontium sulfamate, barium sulfamate, ferric sulfamate and zinc sulfamate and so on can be used. One of sulfamic acid and the salts thereof can be used alone or two or more of sulfamic acid and the salts thereof can be combined to use.

In one embodiment of the present invention, the oxidizing biocide is oxidizing halogen-type substance and the stabilized oxidizing biocide is ammonium sulfate stabilized oxidizing halogen-type substances.

In one embodiment of the present invention, the oxidizing biocide is oxidizing halogen-type substance and the stabilized oxidizing biocide is sulfamic acid stabilized oxidizing halogen-type substances.

In one embodiment of the present invention, the oxidizing biocide is peracetic acid and the stabilized oxidizing biocide is ammonium sulfate stabilized oxidizing halogen-type substance.

In one embodiment of the present invention, the oxidizing biocide is peracetic acid and the stabilized oxidizing biocide is sulfamic acid stabilized oxidizing halogen-type substance.

In one embodiment of the present invention, the oxidizing biocide is hydrogen peroxide and the stabilized oxidizing biocide is ammonium sulfate stabilized oxidizing halogen-type substance.

In one embodiment of the present invention, the oxidizing biocide is hydrogen peroxide and the stabilized oxidizing biocide is sulfamic acid stabilized oxidizing halogen-type substance.

In one embodiment of the present invention, the ammonium sulfate stabilized oxidizing halogen-type substances are ammonium sulfate stabilized oxidizing chlorine-type substances, for example ammonium sulfate stabilized sodium hypochlorite.

In one embodiment of the present invention, the sulfamic acid stabilized oxidizing halogen-type substances are sulfamic acid stabilized oxidizing chlorine-type substances, for example sulfamic acid stabilized sodium hypochlorite.

Sterilizing Scheme

In one embodiment of the present invention, after adding above biocides, the amount of the biocides in the papermaking procedure and/or pulping procedure represented by the total halogen concentration is 0.01 ppm to 10 ppm, preferably is 0.01~2.0 ppm, preferably is 0.1~2.0 ppm, preferably is 0.5~2.0 ppm, preferably is 0.5~5.0 ppm, and preferably is 0.1~5.0 ppm.

In the present invention for convenience sake, the addition amount of the oxidizing biocides and stabilized oxidizing biocides are calculated based on the total halogen concentration, if the total addition amount of oxidizing biocides and stabilized oxidizing biocides can maintain the total halogen concentration measured in the papermaking system according to the following method at 0.01 ppm~10 ppm.

Additionally, those skilled in the art can choose the dosage of biocides according to the activity of microbe existing in the papermaking system.

In the following, the sodium hypochlorite is used to describe as an example of halogen-type oxidant. When adding such oxidizers for example sodium hypochlorite into water, the element chlorine exist in the form of free chlorine (free residual chlorine, sometimes abbreviated as FRC in the following description) and in the form of combined chlorine in water. Typically, the sum of the free chlorine and combined chlorine are known as total chlorine (total residual chlorine, sometimes abbreviated as TRC in the following description). The total chlorine concentration (amount) can be detected according to the following method. The combined chlorine can oxidize the iodide into iodine. The iodine and free chlorine react with DPD (N,N-Diethyl-p-phenylenediamine) to form a red substance, and which can be used to represent the concentration of the total chlorine (using the absorbance obtained at 530 nm measurement to represent the concentration of total chlorine). The free chlorine concentration (amount) can be determined by the following method. The free chlorine which may exist in the form of hypochlorous acid or ions of hypochlorite react with DPD (N,N-Diethyl-p-phenylenediamine) indicator rapidly to form a pink-colored substance, and the strength of such color can be used to indicate the amount of free chlorine, for example the concentration of free chlorine is determined by the measurements of absorbance on 530 nm. In the present invention, TRC and FRC are measured for example by HACH DR2400 or DR2800 spectrophotometer.

In one embodiment of the present invention, after adding above biocides, the total chlorine concentration in the papermaking system measured by the above method is 0.01 ppm to 10 ppm, or is 0.01~2.0 ppm, or is 0.1~2.0 ppm, or is 0.5~2.0 ppm, or is 0.5~5.0 ppm, or is 0.1~5.0 ppm.

If the other kind of oxidizing biocides are applied in the present invention, the total concentrations of the oxidizing biocides can also be determined by detecting the total halogen (or total chlorine).

In one embodiment of the present invention, the oxidizing biocides are added followed by adding stabilized oxidizing biocides.

In another embodiment of the present invention, the stabilized oxidizing biocides are added followed by adding oxidizing biocides.

In one embodiment of the present invention, the above biocides can be added in continuous or batch mode into the papermaking process.

In one embodiment of the present invention, the biocides are added in one or more of the following steps of pulping procedure: adding the biocides when the crushing step begins; adding the biocides during the crushing step; adding the biocides during the screening, thickening and desludging step; adding the biocides during the separation step; adding the biocides during the grinding step; and adding the biocides to the mixing chest.

In one embodiment of the present invention, the positions where the biocides are added in the pulping procedure comprise one or more of the followings: hydrapulping devices, cleaning devices, coarse screening and fine screening devices, pulp storing devices, fiber separation devices, fiber storing devices, concentration devices, grinding devices and/or inlet for the diluting water or white water and so on.

In one embodiment of the present invention, wherein the positions where the biocides are added in the papermaking procedure comprise one or more of the followings: pulp storing devices, broken pools, recycled slurry towers, long fiber or short fiber stock towers, starch stock towers, mixing chests, machine chests, headboxes, high level boxes, wire pits, white water towers, white water pools, cloudy white water pools, filtrate white water pools, clarified water ponds, outlet of fan pumps and/or poly disc filter, warm water chests, clarified water chests, spray ponds and so on.

Through utilizing the method for manufacturing paper according to the present invention to produce paper, not only is the recycled fiber used effectively to produce paper and achieve the reuse of waste paper, but also are a large amount of starch in the recycled fiber protected efficiently. Thus, the addition amounts of the additives such as starches and dry strength agents are reduced significantly, and the strength of the produced paper is improved, and further the cost is saved.

EXAMPLES

The present invention is further explained by giving examples in the following.

Example 1 Measuring Method for Total Starch Concentration in the Recycled Fiber

100% bleached kraft hardwood pulp is used to make pulp, which does not contain starch. The cationic starches are added into the pulp for making paper in the dose of 25 kg starches per a ton of paperboard. The present example applies different means such as heating, adding acid, adding alkali and increasing the conductivity to desorb the starch adsorbed in produced paper produced from the above pulp, followed by using iodine-potassium iodide to detect the starch concentration directly.

(1) Three different pretreatment methods such as heating, adding alkali and adding NaCl to increase the conductivity are applied to separate the starch adsorbed by the pulp.

2.47 g of the above produced paper were weighed and cut into pieces, and followed by adding 300 ml water. It was agitated at 800 rpm and pulped. The obtained slurry was dispensed into a glass container. The starches adsorbed by the fiber were treated by heating, adding alkali (sodium hydroxide) or adding salt (NaCl) individually, followed by adding iodine-potassium iodide complex to develop color at 620 nm and 660 mm. The results are shown in the following table 1.

TABLE 1

| Pretreatment | Vol. of Sample to be detected ml | Final concentration of the treating agents mol/l | Spectrophotometer reading of 2 ml sample | | Average starch content g/100 g paper |
|---|---|---|---|---|---|
| | | | 620 nm | 660 nm | |
| Heating | 90 | / | 0.011 | 0.008 | 0.20 |
| Adding alkali | 90 | 0.5 | 0.27 | 0.228 | 2.59 |
| Adding NaCl | 90 | 0.45 | 0.079 | 0.061 | 0.77 |

The results of table 1 indicate that heating or adding NaCl to increase the conductivity can not help to separate the starches adsorbed by the fiber effectively, and adding alkali obtained the maximum separation effect of starch.

(2) Alkali Treatment for Fiber

The virgin fiber, bleached pulp and semi-bleached pulp were treated by alkali during heating and the pH was adjusted, followed by adding iodine-potassium iodide complex to develop color at 620 nm and 660 mm. The results showed that there were no starches. The above results indicate that pretreatment does not degrade the cellulose which is similar to starch in structure. It will not cause error in experiment.

Example 2

Papermaking with Recycled Waste Paper (Recycled Fiber)

150 g standard American Old Corrugated Containers (sometimes called as AOCC) were weighted and cut into pieces. The pieces were immersed into 15 kilograms water overnight. The obtained sample was disintegrated by Valley Beater for 30 minutes and pulped for 20 minutes, and the pulp concentration thereof is about 1%. The cationic starches were replenished so as to make the concentration of starch 80 kg/Ton paper. The recycled waste paper with high content of starch was used to manufacture paper.

Wherein, the total starch content of the recycled American Old Corrugated Container was detected, the detecting method was similar to Example 1. The sodium hydroxide concentration was kept at 0.5 mol/l. The sample was kept at 60° C. for about 20 minutes. The content of the starch was then detected by iodine-potassium iodide complex method. The result showed that the total starch content of the American Old Corrugated Container is 9.1%.

Microbes' Cultivation

The above obtained pulp was inoculated by the pulp which was contaminated by bacteria in the ratio of one to thousand, followed by cultivating for 3 hours at 37° C. The simulation pulp contaminated by the microbes was obtained to use for the following experiment. The pH, oxidation-reduction potential (ORP), concentration of adenosine triphosphate (ATP) and total number of aerobic bacteria colonies of the pulp which was contaminated initially by the microbes were detected. The detection methods were followed the common methods in the art.

Biocides Treatment

The ammonium sulfate stabilized sodium hypochlorite (biocide) was prepared, and followed by measuring the total chlorine content of the prepared biocides (above DPD detection method). The ammonium sulfate stabilized sodium hypochlorite was added into the pulp that was inoculated by microbes. The biocide was added into the pulp twice a day and the concentrations of the total chlorine (active chlorine) were maintained at 5 ppm, 10 ppm and 20 ppm respectively by controlling the addition doses. Thus, three different treating samples kept different levels of the bacteria. Another pulp that was inoculated by microbes according to the above same method without adding any stabilized oxidizing biocides was used as blank sample. The whole experiment conducted for 9 days.

During the experiment, the pH, oxidation-reduction potential (ORP), concentration of adenosine triphosphate (ATP) and total number of aerobic bacteria colonies of the treated samples and blank sample were detected every day. At the last day of observation (The ninth day), the total starch concentrations of the above pulp samples were detected according to the above method.

Figure 2:
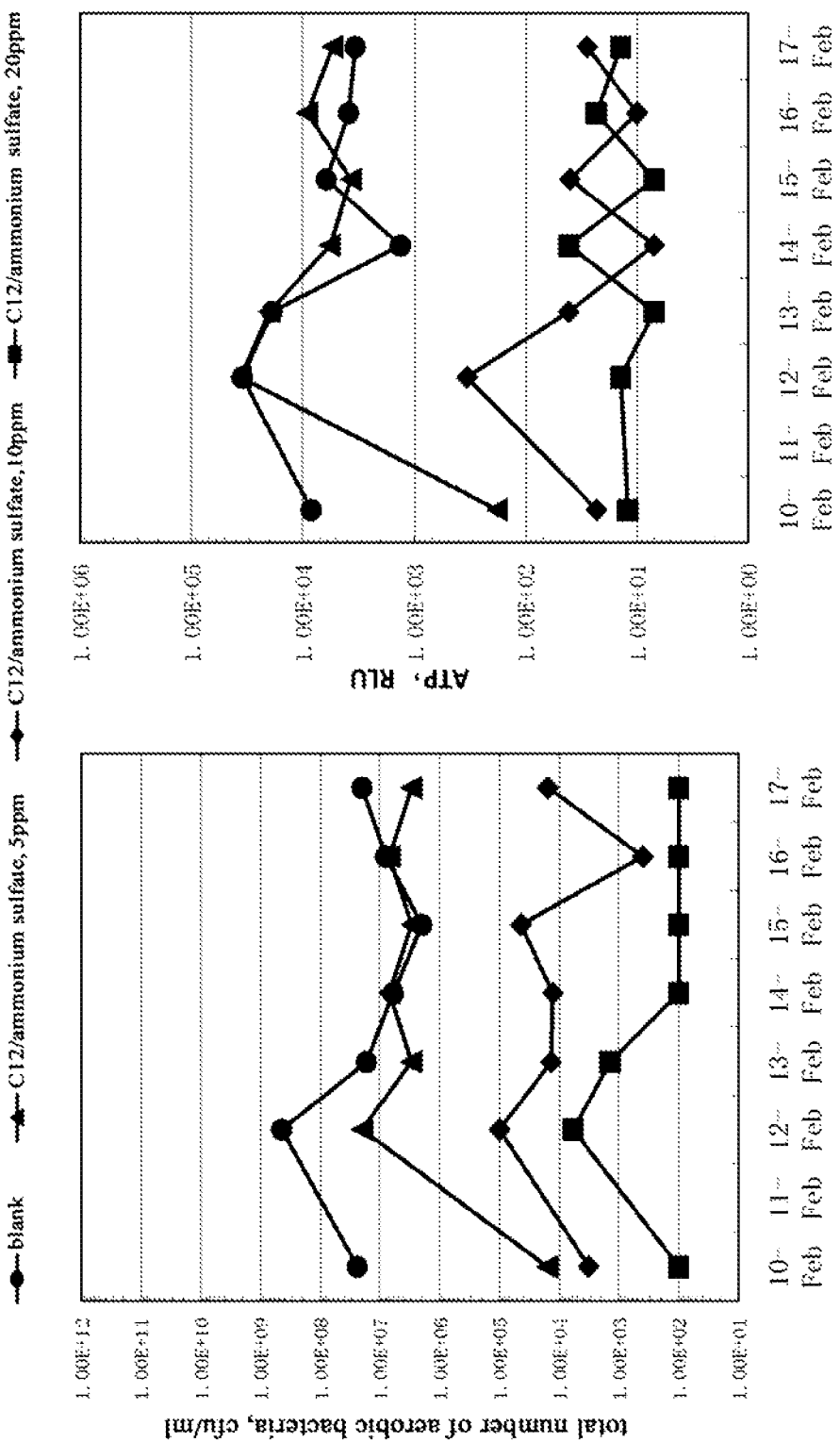
FIG. 2 is a graph that illustrates the changes in aerobic bacteria number and ATP of the pulp slurry of Example 2 with the stabilized oxidizing biocides added and the pulp slurry of blank sample with respect to the time.

FIG. 1 illustrates the changes of pH and ORP with respect to time (The first day to the ninth day). FIG. 2 illustrates the changes of ATP and aerobic bacteria number with respect to time (The first day to the ninth day).

Paper Strength Test on the Produced Paper

Figure 4A:
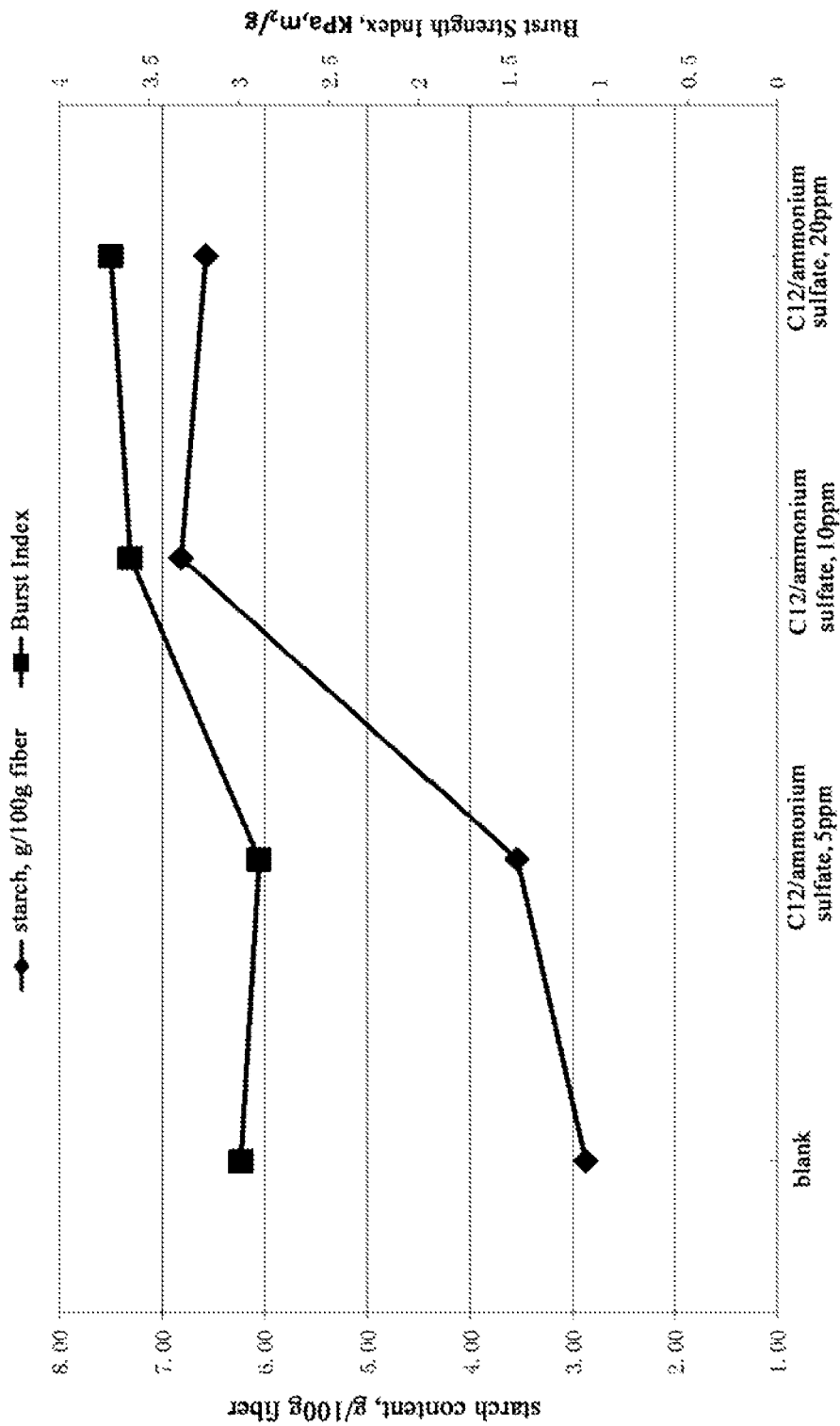
FIG. 4A is a graph that illustrates the bursting strength index of the paper sheets produced by several pulps of the Example 2.
Figure 4B:
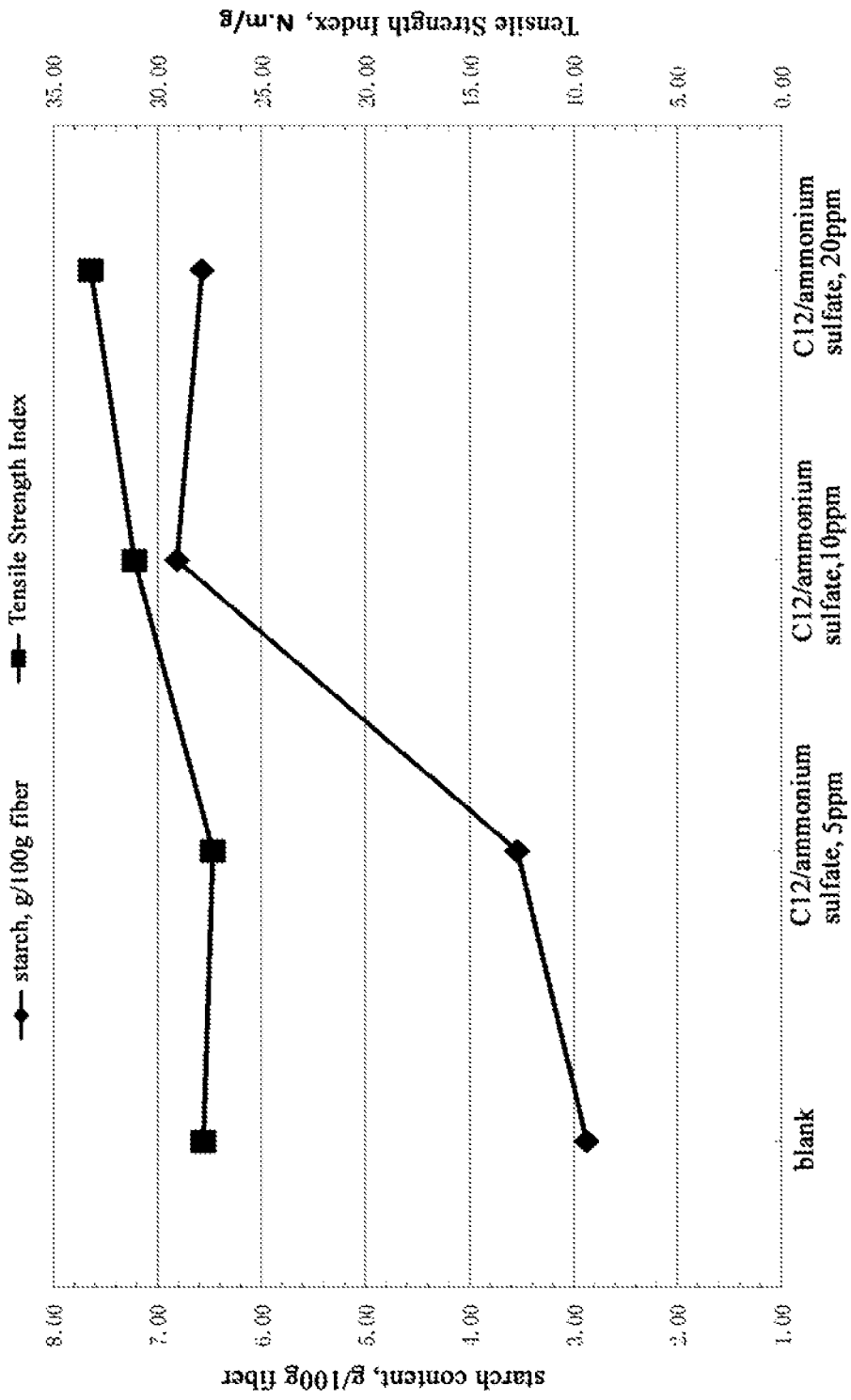
FIG. 4B is a graph that illustrates the tensile strength index of the paper sheet produced by several pulps of the Example 2.

The 9 days treated pulp sample and blank sample were monitored and used to produce paper by HandSheet Former. The additional starches were not added to increase strength and only the retention aid and dry strength agent in same dose were added. The paper pulps were dehydrated, formed and dried, followed by testing the paper strength properties which include paper thickness, bursting strength, compressive strength and tensile strength. The results are shown in FIG. 4A and FIG. 4B respectively. Wherein the tensile strength index of paper is tested by the Tensile Tester (Lorentzen & Wettre) and the bursting strength index of paper is tested by Bursting Strength Tester (Lorentzen & Wettre).

Figure 3:
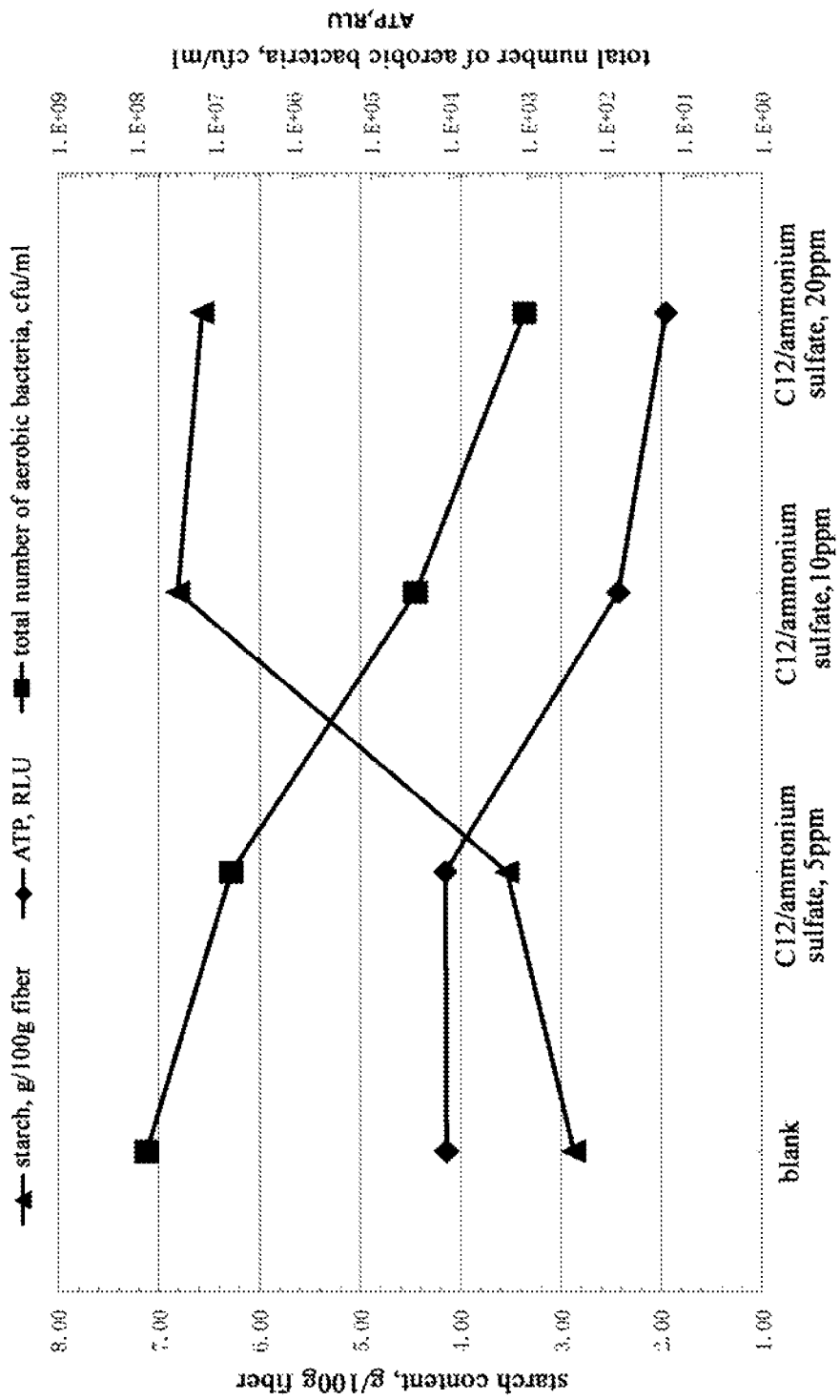
FIG. 3 is a graph that illustrates the ATP concentration, total number of aerobic bacteria, and starch content of the pulp of Example after treating for 9 days.

FIG. 3 illustrates the ATP concentration, total aerobic bacteria number, starch concentration of the 9 days treated pulp.

FIG. 4A illustrates the bursting strength index of the paper produced from the 9 days treated pulp.

FIG. 4B illustrates the tensile strength index of the paper produced from the 9 days treated pulp.

The FIG. 1 to 4 show that the pH and oxidation-reduction potential of the pulp which is produced by the stabilized oxidizing biocides-treated recycled fiber are higher than that of blank sample. The low pH of the blank sample indicates that blank sample produces acidic gas due to microbe action, which leads to increase in acidity of the sample. After adding stabilized oxidizing biocides, the microbe activities including ATP and total bacterial number are inhibited effectively (see FIG. 2). Such inhibition action relates to the doses of the stabilized oxidizing biocides (which are represented by total chlorine). The higher the total chlorine concentration is the more significant effect it has.

The total starch contents were measured according to the above method. The total starch content of the blank sample pulp reduced from 8% to 2.87%. The starch content of the pulp that was added with stabilized oxidizing biocides only reduced slightly, and the starches thereof were protected. The starch concentrations maintained at 6.81% and 6.57%, when the total (active) chlorine concentrations were 10 ppm and 20 ppm, respectively.

The paper was produced by using above different pulps. The strength of paper which is produced by stabilized oxidizing biocides-adding pulp is higher than that of blank sample. The bursting strength and tensile strength increase 24.3% and 19.5% comparing with that of blank sample respectively. The results of example 2 show that pH and oxidation-reduction potential of the pulp which is continuously added with oxidizing biocides are stable. The recycled fiber is protected from degrading, which reduce the lost of the adsorbed additives such as starches and improve the paper strength.

Example 3

Papermaking with Recycled Waste Paper (Recycled Fiber)

150 g standard American Old Corrugated Containers (sometimes called as AOCC) were weighted. The total starch content of the recycled American Old Corrugated Container was detected according to the same starch measuring method of example 2, and the result was 3.01%.

The above waste paper was cut into pieces and immersed into 15 kilograms water overnight. The obtained sample was disintegrated by Valley Beater for 30 minutes and pulped for 20 minutes, and the pulp concentration thereof is about 1%.

Microbes' Cultivation

The above pulp sample was inoculated with a few of virgin pulp from papermaking plant and tryptic soy broth, followed by cultivating overnight at 37° C. The simulation pulp was obtained to use for the following experiment. The pH, oxidation-reduction potential (ORP), concentration of adenosine triphosphate (ATP) and total number of aerobic bacteria colonies of the pulp which was contaminated initially by the microbes were detected.

Biocides Treatment

The ammonium sulfate or sulfamic acid stabilized sodium hypochlorite (biocide) was prepared, and followed by measuring the total (active) chlorine content of the prepared biocides by the same method of example 2. The ammonium sulfate or sulfamic acid stabilized sodium hypochlorite was added into the above stimulation pulp once a day and the concentrations of the total chlorine were maintained at 5 ppm and 20 ppm respectively by controlling the addition doses. Thus, the pulps kept different levels of the bacteria. Another pulp that was inoculated by microbes according to the above same method without adding any stabilized oxidizing biocides was used as blank sample. The whole experiment conducted for 9 days.

During the experiment, the pH, oxidation-reduction potential (ORP), concentration of adenosine triphosphate and total number of aerobic bacteria colonies of the treated samples and blank sample were detected every day according to the same methods of example 2. At the last day of observation, the total starch concentrations of the above pulp were detected according to the above method. The pH and ORP data are shown in FIG. 5.

Paper Strength Test on the Produced Paper

Figure 6:
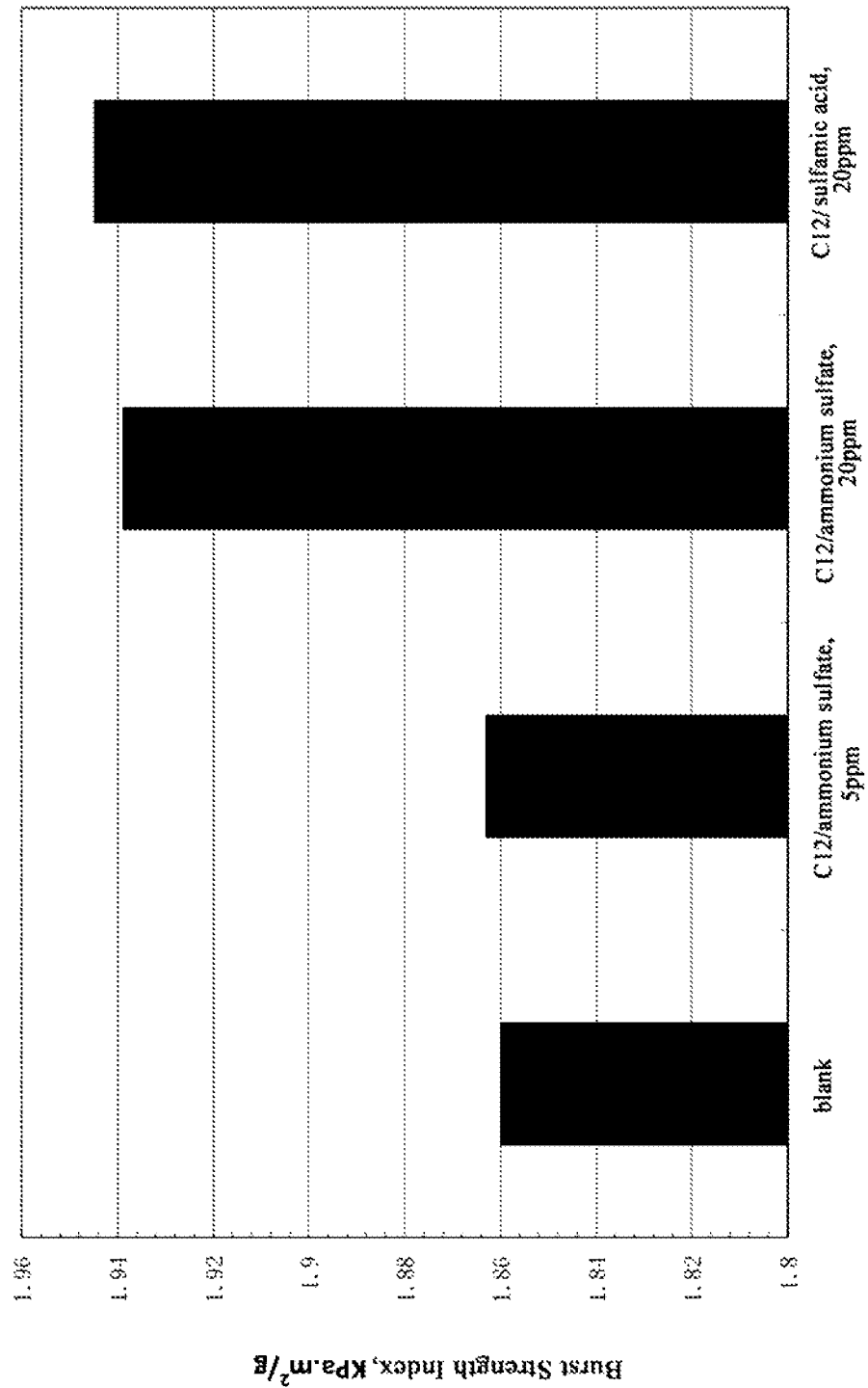
FIG. 6 is a graph that illustrates the bursting strength index of the paper sheets produced by several pulps of the Example 3.

The 9 days treated pulp sample and blank sample were monitored and used to produce paper by HandSheet Former. The additional starches were not added to increase strength and only the retention aid and dry strength agent in same dose were added. The pulps were dehydrated, formed and dried, followed by testing the paper strength properties which include paper thickness, bursting strength, compressive strength and tensile strength and testing ATP, starch content and total number of aerobic bacteria. The results are shown in FIG. 6. FIG. 6 indicates the bursting strength index of different samples (the bursting strength index detection method is the same as that of example 2).

Figure 5:
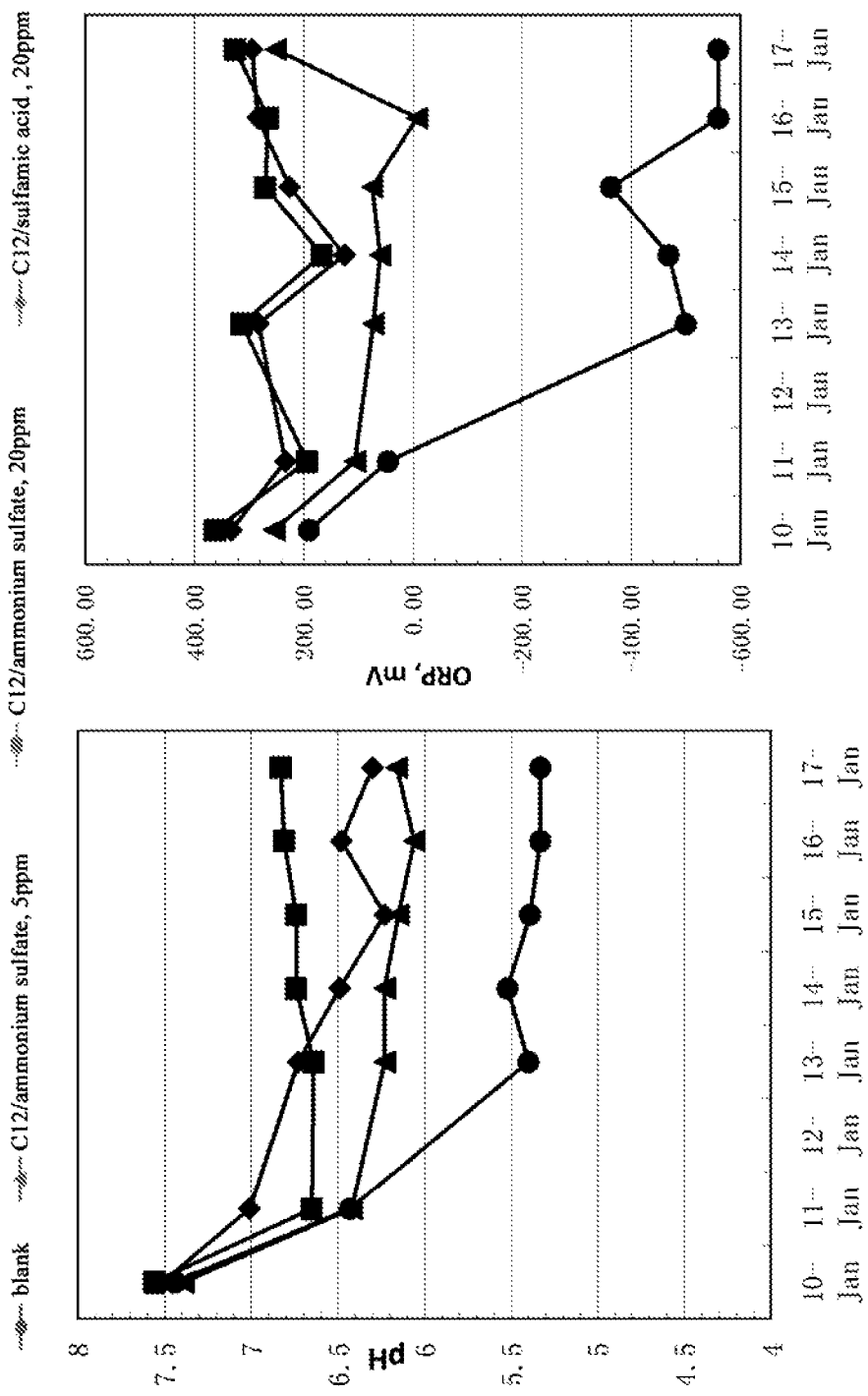
FIG. 5 is a graph that illustrates the changes in ORP and pH of the pulp slurry of Example 3 with the stabilized oxidizing biocides added and the pulp slurry of blank sample with respect to the time.

The FIG. 5 and FIG. 6 show that the pH and oxidation-reduction potential of the system which is produced by the ammonium sulfate or sulfamic acid stabilized oxidizing biocides-treated recycled fiber are higher than that of blank sample, respectively. The ORP of blank sample which was not added with any oxidizing biocides declined to −200 mV or less. The paper strength test results show that the bursting strength of paper which is produced by ammonium sulfate or sulfamic acid stabilized oxidizing biocides-adding pulp increase significantly comparing with that of blank sample.

According to the results of example 3, it is clear that after the treatment by ammonium sulfate or sulfamic acid stabilized oxidants, the starches, etc. in the recycled are protected. The bursting strength of the obtained paper which is produced without adding additional starch during the manufacturing process is high than that of blank sample.

Example 4

Papermaking with Recycled Waste Paper (Recycled Fiber)

150 g standard American Old Corrugated Containers (sometimes called as AOCC) were weighted. The total starch content of the recycled American Old Corrugated Containers was detected according to the same starch measuring method of example 2, and the result was 9.1%.

In the pulping and papermaking process, the above waste paper was cut into pieces and immersed into 15 kilograms water overnight. The obtained sample was disintegrated by Valley Beater for 30 minutes and pulped for 20 minutes, and the pulp concentration thereof is about 1%.

Microbes' Cultivation

The above obtained pulp was inoculated by the pulp which was contaminated by bacteria in the ratio of one to thousand, followed by cultivating for 3 hours at 37° C. The simulation pulp contaminated by the microbes was obtained to use for the following experiment. The pH, oxidation-reduction potential (ORP), concentration of adenosine triphosphate (ATP) and total number of aerobic bacteria colonies of the pulp which was contaminated initially by the microbes were detected.

Biocides Treatment

The ammonium sulfate or sulfamic acid stabilized sodium hypochlorite solution (biocide) was prepared, and followed by measuring the total chlorine content of the prepared biocides (DPD detection method). The above inoculated pulp was divided into 6 samples, wherein one of the samples was used as blank sample. Three of the pulp samples were added with ammonium sulfate stabilized sodium hypochlorite, sulfamic acid stabilized sodium hypochlorite and sodium hypochlorite respectively. The total chlorine doses of all of the three pulp samples were controlled to 20 ppm.

With regard to the other two samples, one was added with sodium hypochlorite firstly (the addition amount of sodium hypochlorite made the total chlorine of the pulp 10 ppm), and followed by adding stabilized halogen oxidant, Cl2/sulfamic acid (i.e., the sulfamic acid stabilized sodium hypochlorite, the addition amount of Cl2/sulfamic acid made the total chlorine concentration of the pulp 10 ppm. The total chlorine of the sample was 20 ppm accordingly). Another one was added with sodium hypochlorite firstly (the addition amount of sodium hypochlorite made the total chlorine of the pulp 10 ppm), and followed by adding stabilized halogen oxidant, Cl2/ammonium sulfate (i.e., the ammonium sulfate stabilized sodium hypochlorite, the addition amount of Cl2/ammonium sulfate made the total chlorine concentration of the pulp 10 ppm. The total chlorine of the sample was 20 ppm accordingly).

The above substances were added into the pulps once a day and the concentrations of the total chlorine were maintained at 20 ppm by controlling the addition doses. The whole experiment was conducted for 5 days and the total starches contents were monitored.

As shown in FIG. 7, the starch degradation rates of the recycled fibers which are treated by sodium hypochlorite, stabilized oxidant Cl2/sulfamic acid, and stabilized oxidant Cl2/ammonium sulfate are improved when comparing with the blank sample, which decrease to 5%, 14.46% and 1.32%, respectively from 25%. When using the sodium hypochlorite (bleaching water) and stabilized sodium hypochlorite together, the protection for starch is further enhanced comparing with single biocide (at same dosage). The starch degradation rate of the sample that is treated with bleaching water+Cl2/sulfamic acid is just 1.2%. The starches are not observed to be degraded after that the sample was treated by bleaching water+Cl2/ammonium sulfate.

When controlling at the same total chlorine concentration, adding biocides and stabilized biocides together can protect the starch from degrading more effectively.

While this invention may be embodied in many different forms described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments described herein and incorporated herein.

The above disclosure is intended to be illustrative and not exclusive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method for manufacturing paper using recycled fiber as a raw material, comprising:
   a pulping procedure comprising pulping the raw material containing recycled fiber crushing the raw material;
   screening, thickening and desludging the pulp obtained in the crushing step
   separating fiber in the pulp slurry obtained after the screening, thickening and desludging steps into short fiber and long fiber
   grinding the short fiber obtained from the separating step to form ground short fiber, and
   heat dispersing and grinding the long fiber to form ground long fiber, followed by transferring the ground long fiber and ground short fiber to a papermaking procedure comprising producing paper with said ground long fiber and ground short fiber;
   wherein the total starch content in recycled fiber is measured before recycled fiber is pulped, and when the total starch content in recycled fiber is higher than a predetermined value, a first amount of one or more biocides are added during the pulping procedure,
   wherein the total starch content of recycled fiber is measured by:
      mixing a sample of recycled fiber into water to form a slurry of the sample to be measured,
      adding alkali to the obtained slurry and reacting at a temperature of 50 to 100° C., and
      measuring the starch content of the slurry after the reaction, wherein the starch content is the total starch content of the sample for measuring.

2. The method for manufacturing paper of claim 1, wherein the predetermined value is 0.1 to 100 g starch/kg recycled fiber.

3. The method for manufacturing paper of claim 1, wherein the alkali is selected from the group consisting of sodium hydroxide, potassium hydroxide, calcium hydroxide, barium hydroxide, and ammonium hydroxide.

4. The method for manufacturing paper of claim 1, wherein the alkali is added to the slurry in a final concentration of 0.05 mol/L to 10 mol/L.

5. The method for manufacturing paper of claim 1, wherein the first amount of the one or more biocides are added in one or more of the following steps of the pulping procedure:
   adding the biocides when the crushing step begins;
   adding the biocides during the crushing step;
   adding the biocides during the screening, thickening and desludging steps;
   adding the biocides during the separation step;
   adding the biocides during the grinding step; and
   adding the biocides to a mixing chest.

6. The method for manufacturing paper of claim 1, wherein the locations where the first amount of the one or more biocides are added in the pulping procedure are selected from the group consisting of
   a hydrapulping device, a trash-cleaning device, a coarse screening device, a fine screening device, a pulp storing device, a fiber separation device, a fiber storing device, a thicken device, a grinding device, an inlet for diluting water, an unlet for white water, and any combination thereof.

7. The method for manufacturing paper of claim 1, wherein recycled fiber further comprises broken paper from a broken paper device of a papermaking process.

8. The method for manufacturing paper of claim 1, wherein the biocides are oxidizing biocides or stabilized oxidizing biocides.

9. The method for manufacturing paper of claim 8, wherein the oxidizing biocides comprise oxidizing halogen-type substances, peracetic acid and hydrogen peroxide.

10. The method for manufacturing paper of claim 8, wherein the stabilized oxidizing biocides are sulfamic acid and/or ammonium sulfate stabilized oxidizing halogen-type substances.

11. The method for manufacturing paper of claim 9, wherein the oxidizing halogen-type substances are oxidizing chlorine-type substances or oxidizing bromine-type substances.

12. The method for manufacturing paper of claim 9, wherein the oxidizing chlorine-type substances are chlorine, sodium hypochlorite, calcium hypochlorite, trichloroisocyanuric acid (TCCA), dichloroisocyanuric acid (DCCA), 1-bromo-3-chloro-5,5-dimethyl hydantoin (BCDMH) or 1,3-dichloro-5,5-dimethylhydantoin (DCDMH).

13. The method for manufacturing paper of claim 1, wherein the first amount of the biocides in the pulping procedure and/or the papermaking procedure represented by the total halogen concentration after the addition of the biocides is 0.01 ppm to 10 ppm.

14. The method for manufacturing paper of claim 8, wherein
the oxidizing biocides are added, followed by the addition of the stabilized oxidizing biocides; or
the stabilized oxidizing biocides are added, followed by the addition of the oxidizing biocides.

* * * * *